(12) United States Patent
Van Zee et al.

(10) Patent No.: US 7,396,605 B2
(45) Date of Patent: Jul. 8, 2008

(54) METHOD AND SYSTEM FOR IMPROVING THE PERFORMANCE OF A FUEL CELL

(76) Inventors: John W. Van Zee, Department of Chemical Engineering University of South Carolina, Columbia, SC (US) 29208; Woo-kum Lee, Dept. of Chemical Engineering, Univ. of South Carolina, Columbia, SC (US) 29208; Mahesh Murthy, 201 Airport Rd., Elkton, MD (US) 21922-1488

( * ) Notice: Subject to any disclaimer, the term of this patent is extended or adjusted under 35 U.S.C. 154(b) by 914 days.

(21) Appl. No.: 10/385,413

(22) Filed: Mar. 10, 2003

(65) Prior Publication Data

US 2003/0235728 A1    Dec. 25, 2003

Related U.S. Application Data

(60) Provisional application No. 60/363,077, filed on Mar. 11, 2002, provisional application No. 60/362,615, filed on Mar. 8, 2002.

(51) Int. Cl.
*H01M 8/18* (2006.01)

(52) U.S. Cl. .............................. 429/24; 429/20; 429/23

(58) Field of Classification Search ................... 429/13, 429/23, 24, 17
See application file for complete search history.

(56) References Cited

U.S. PATENT DOCUMENTS

| | | | |
|---|---|---|---|
| 4,639,306 A | 1/1987 | Tomasovic et al. | |
| 4,820,386 A | 4/1989 | LaConti et al. | |
| 5,041,195 A | 8/1991 | Taylor et al. | |
| 5,133,842 A | 7/1992 | Taylor et al. | |
| 5,173,166 A | 12/1992 | Tomantschger et al. | |
| 5,302,274 A | 4/1994 | Tomantschger et al. | |
| 5,677,073 A | 10/1997 | Kawatsu | |
| 5,712,052 A | 1/1998 | Kawatsu | |
| 5,843,195 A | 12/1998 | Aoyama | |
| 5,876,867 A | 3/1999 | Itoh | |
| 5,897,766 A | 4/1999 | Kawatsu | |
| 5,925,476 A * | 7/1999 | Kawatsu ...................... | 429/24 |
| 6,099,708 A | 8/2000 | Mallory et al. | |
| 6,106,963 A * | 8/2000 | Nitta et al. .................... | 429/19 |
| 6,120,925 A | 9/2000 | Kawatsu et al. | |
| 6,129,825 A | 10/2000 | Mallory et al. | |
| 6,165,633 A | 12/2000 | Negishi | |

(Continued)

*Primary Examiner*—Patrick Ryan
*Assistant Examiner*—Keith Walker
(74) *Attorney, Agent, or Firm*—Seann P. Lahey; McNair Law Firm, P.A.

(57) ABSTRACT

An electrochemical fuel cell system adapted for maintaining the efficient production of electrical power. The system comprises a fuel supply containing a hydrogen rich gaseous fuel for delivery to a fuel cell. A fuel supply conduit connects the fuel supply and the fuel cell for delivering a fuel stream of the hydrogen rich gaseous fuel to the fuel cell. An impurity sensor is carried by the fuel supply conduit for detecting impurities in the fuel stream prior to the impurities entering the fuel cell. A heating mechanism is provided in communication with the impurity sensor being operatively associated with the fuel cell for changing the temperature of the fuel cell. The heating mechanism raises the temperature of the fuel cell from a normal operating temperature to an elevated operating temperature when the impurity sensor detects impurities in the fuel stream to prevent the impurities from interfering with fuel cell efficiency.

15 Claims, 4 Drawing Sheets

U.S. PATENT DOCUMENTS

| | | |
|---|---|---|
| 6,200,443 B1 | 3/2001 | Shen et al. |
| 6,210,820 B1 | 4/2001 | Knights et al. |
| 6,290,913 B1 | 9/2001 | Aoyama |
| 6,331,694 B1 | 12/2001 | Blankenship |
| 6,332,901 B1 | 12/2001 | Nagamiya et al. |
| 6,358,638 B1 * | 3/2002 | Rock et al. .................... 429/13 |
| 2002/0081471 A1 | 6/2002 | Keegan et al. |
| 2002/0094467 A1 * | 7/2002 | Nonobe et al. ................ 429/34 |

* cited by examiner

FIGURE 3      Recovery Scheme for Fuel cell performance during exposure to 3,000 ppm CO for 5 seconds at 600 mA/cm$^2$

Fig. 4

METHOD AND SYSTEM FOR IMPROVING THE PERFORMANCE OF A FUEL CELL

FIELD OF THE INVENTION

The present invention relates to a method and system for improving the performance of electrochemical fuel cells, and more particularly, to a method and system for varying the temperature within the fuel cell to diminish electrocatalyst poisoning caused by impurities in the fuel stream.

Applicant claims priority of provisional application numbers 60/362,615 filed Mar. 8, 2002 and 60/363,077 filed Mar. 11, 2002.

BACKGROUND OF THE INVENTION

As the power needs of society increase and with the depletion of fossil fuels, there is a need for power services that provide clean efficient power. Such needs exist both for mobile applications such as the automotive industry and stationary applications as powering manufacturing facilities or commercial enterprises. To meet these needs, electrochemical fuel cells have been developed to convert the chemical energy of a fuel directly into electrical energy thereby providing a clean and efficient source of electrical power. Generally, a fuel cell includes a pair of electrodes arranged across an electrolyte, wherein the surface of one electrode is exposed to hydrogen or a hydrogen rich gaseous fuel, and the surface of the other electrode is exposed to an oxygen-containing oxidizing gas, typically air. Inside the fuel cell, hydrogen rich gas from the fuel source reacts electrochemically at a first electrode (anode) and is converted into protons and electrons by a catalyst. When converted, the protons move through an electrolyte to a second electrode (cathode) that also includes a catalyst. The catalyst induces oxygen from an air supply to combine with the hydrogen protons and electrons to form water, which is expelled from the fuel cell as vapor. The involvement of hydrogen and oxygen in the two reactions, one releasing electrons and the other consuming them, yields electrical energy across the anode and cathode by way of an external circuit, thereby generating electrical power.

Many electrochemical fuel cells employ a membrane electrode assembly ("MEA") in which the intermediate electrolyte comprises a solid polymer electrolyte or ion-exchange membrane disposed between two porous electrically conductive electrode layers (the anode and the cathode). At the anode, the fuel ($H_2$) is directed through a porous layer of the anode where it can be oxidized by the electrocatalyst to produce protons and electrons from the hydrogen rich fuel. The protons migrate through the polymer electrolyte membrane toward the cathode electrocatalyst to bind with the oxygen and separated electrons from the hydrogen. Once across the polymer electrolyte membrane, the oxidant ($O_2$) enters through the porous cathode to react with the protons and electrons on the cathode electrocatalyst to form water. The electrons travel from the anode to the cathode through an external circuit, which produces an electrical current.

The basic reaction for powering a hydrogen based fuel cell is as follows:

Anode: $2H_2 \longrightarrow 4H^+ + 4e^-$
Cathode: $O_2 + 4H^+ + 4e^- \longrightarrow 2H_2O$
Overall: $2H_2 + O_2 \longrightarrow 2H_2O$ A process known as reforming produces hydrogen from hydrocarbon fuels such as methanol or gasoline. Unfortunately, the stream of fuel produced by a reformer contains impurities that inhibit the desired electrochemical reaction within the fuel cell. These impurities are absorbed chemically or physically on the surface of the anode electrocatalyst and prevent $H_2$ from bonding to active electrocatalyst sites on the anode where it can be broken down into its protons and electrons. By disrupting the anode reaction, the number of electrons traveling from anode to cathode is reduced and the efficiency of the fuel cell is detrimentally affected. Impurities in the fuel stream that reduce the efficiency are known as electrocatalyst "poisons" and their effect on fuel cells is known as "electrocatalyst poisoning." Electrocatalyst poisoning results in reduced fuel cell performance thereby reducing the voltage output of the fuel cell for a given current density.

Reformate fuel streams derived from hydrocarbons such as methanol ($CH_3OH$) contain high concentrations of $H_2$ and are well suited to fuel the electrochemical fuel cell. However, such fuels also contain electrocatalyst poisons such as carbon monoxide (CO) that exist in relatively small quantities in the fuel stream used to supply hydrogen rich gas to the fuel cell. The basic reactions for using methanol fuel to provide a hydrogen rich gas through a reformer for the fuel cell is shown as follows:

(1) $CH_3OH \longrightarrow 2H_2 + CO$
(2) $CO + H_2O \longrightarrow H_2 + 2H_2O$
Overall: $CH_3OH + H_2O \longrightarrow 3H_2 + CO_2$ However, the above reactions do not practically result in the conversion of 100% of the carbon monoxide to $CO_2$ and causes this impurity to enter the fuel cell. In fact, most reformers typically produce hydrogen gas containing up to 1% carbon monoxide. Additional steps can be taken to further reduce the carbon monoxide levels to around 10-100 ppm, but under normal operation of the reformer, there are transients that may cause the carbon monoxide levels to exceed the set points of normal operation for the reformer and the fuel cell. Even minute amounts of carbon monoxide can cause substantial degradation of the fuel cell performance. To reduce the effects of poisoning on the anode electrocatalyst by impurities like carbon monoxide created by the incomplete reaction of trace amounts of carbon monoxide from the above equation, it is possible to pre-treat the fuel supply stream prior to it entering the fuel cell. However, these pretreatment methods for fuel streams cannot effectively remove 100% of the carbon monoxide or other impurities that interfere with fuel cell efficiency. Even trace amounts of 10 ppm can result in electrocatalyst poisoning and cause a substantial reduction in fuel cell performance. Increasing the temperature of a fuel cell can reduce the ability of impurities to bond with the electrocatalyst. However, maintaining the fuel cell at a higher temperature reduces the operational life of the fuel cell by damaging the MEA and results in a reduction of the overall efficiency and useful life of the fuel cell. It should be noted that while carbon monoxide is used in the above discussion, other impurities such as $H_2S$, $NH_3$, or other elements or compounds also degrade the performance of fuel cells at both the anode and cathode sides of the cell. It is to be understood that impurities can also interfere with the cathode that can include impurities in the air added to the cathode. For example, hydrocarbons can exist in the air in close proximity to a combustion engine or in the air as a hydrocarbon fuel station. Accordingly, the ability to reduce electrocatalyst poisoning of a fuel cell at both the anode and cathode is a problem to which significant attention should be directed.

Therefore, it is an object of the present invention to manipulate the temperature of a fuel cell to reduce the ability of impurities in the fuel cell fuel stream to bind with active electrocatalyst sites.

It is another object of the present invention to manipulate the temperature of the fuel cell to reduce the effect of impurities while reducing deterioration of the membrane electrode assembly.

SUMMARY OF THE INVENTION

The above objectives are accomplished according to the present invention by providing an electrochemical fuel cell system adapted for maintaining the efficient production of electrical power. The system comprising a fuel supply containing a hydrogen rich gaseous fuel for delivery to a fuel cell. A fuel supply conduit connects the fuel supply and the fuel cell for delivering a fuel stream of the hydrogen rich gaseous fuel to the fuel cell. An impurity sensor is carried by the fuel supply conduit for detecting impurities in the fuel stream prior to the impurities entering the fuel cell. A heating mechanism is in communication with the impurity sensor being operatively associated with the fuel cell for changing the temperature of the fuel cell. The heating mechanism raises the temperature of the fuel cell from a normal operating temperature to an elevated operating temperature when the impurity sensor detects impurities in the fuel stream. As a result, the detrimental effect of impurities in the fuel stream on the normal operation of the fuel cell is reduced.

In the preferred embodiment, the impurity sensor is constructed and arranged to detect a rise or drop in the level of impurities from a predetermine level of impurities. The impurity sensor signals the heating mechanism to raise the temperature of the fuel cell from the normal operating temperature to the elevated operating temperature when the impurity sensor detects a rise in the level of impurities in the fuel stream above the predetermined level. The impurity sensor signals the heating mechanism to cease raising the temperature of the fuel cell and return the fuel cell to the normal operating temperature when the impurity sensor detects a drop in the level of impurities in the fuel stream below the predetermined level.

In a further advantageous embodiment, a control unit is provided in electronic communication with the impurity sensor and the heating mechanism. The control unit monitors the level of impurities detected by the impurity sensor and signals the heating mechanism to raise the temperature of the fuel stream to raise the temperature of the fuel cell to the elevated operating temperature when a rise in the level of impurities is detected beyond a predetermined level. The control unit signals the heating mechanism to cease raising the temperature of the fuel stream to return the fuel cell to the normal operating temperature when the level of impurities monitored by the control unit and detected by the impurity sensor drops below the predetermined level.

Preferably, the heating mechanism is activated to raise the temperature of the fuel cell to the elevated operating temperature for a predetermined period of time upon detection of an impurity in the fuel stream. The heating mechanism is deactivated after the predetermined period of time to return the fuel cell to the normal operating temperature so that after the impurity has pass completely through the fuel cell, the operating temperature can be decreased to preserve operational life of the fuel cell.

In the preferred embodiment, the heating mechanism includes a hot gas injector connected to the fuel supply conduit. The hot gas injector introducing a stream of heated gas into the fuel supply conduit to rapidly raise the temperature of the fuel cell so that the impurities are prevented from binding to electrocatalysts contained within the fuel cell. Preferably, the hot gas injector introduced heated hydrogen gas into the fuel supply conduit to raise the temperature of the fuel stream.

In a further advantageous embodiment, the heating mechanism includes a heating coil disposed around the fuel supply conduit. The heating coil heats the fuel stream within the fuel supply conduit prior to entering the fuel cell to rapidly raise the temperature of the fuel cell so that the impurities are prevented from binding to electrocatalysts contained within the fuel cell.

A voltage sensor may also be provided for detecting a rise or drop in the voltage of the fuel cell from a predetermined voltage level. The voltage sensor is operatively associated with the heating mechanism for signaling the heating mechanism to increase the temperature of the fuel cell to the elevated operating temperature when a drop in voltage is detected below the predetermined voltage level to remove impurities from the fuel cell. Additionally, the voltage sensor signals the heating mechanism to cease raising the temperature of the fuel cell and return the fuel cell to the normal operating temperature when the voltage sensor detects a return in voltage to the predetermined voltage level.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE PREFERRED EMBODIMENTS

The present invention diminishes the effects of electrocatalyst poisoning by providing a method and system for varying the temperature of the fuel cell according to the level of impurities present in the fuel stream. The temperature inside the fuel cell is rapidly changed from the normal operating temperature to a higher operating temperature when a burst of carbon monoxide or other impurities are detected in the fuel stream. An impurity sensor is disposed along a fuel supply conduit to detect increased levels of impurities before the impurity can enter the fuel cell. It is to be understood that various types of impurity sensors can be utilized to detect a variety of impurities in the fuel stream, such as CO, $NH_3$ and $H_2S$ sensors. For illustrative purposed of a preferred embodiment, the impurity sensor is a carbon monoxide sensor. Additionally, the preferred embodiment is described for a poly-electrolyte membrane fuel cell (PEMFC) such as a membrane electrode assembly (MEA) marketed under the trademark PRIMEA®. A temperature change of 70° C. to 90° C. for this fuel cell, occurring with the fuel cell maintained at a pressure of approximately 202 kPa, diminishes the poisoning rate of impurities on the electrocatalyst. This temperature change is accomplished through the introduction of a burst of hot gas from a gas injector located downstream of the impurity sensor and before the fuel cell. In the preferred embodiment, the carbon monoxide sensor sends a signal to a control unit when a burst of carbon monoxide from a reformer is detected. The control unit then signals the gas injector to open a control valve and rapidly infuse heated $H_2$ into the fuel supply conduit of the fuel cell, thereby raising the fuel cell temperature to prevent the binding of impurities on the electrocatalyst either by chemical or physical absorption to the electrocatalyst. In an alternative embodiment, the existing fuel stream can be heated through a heating coil displaced around the injected fuel stream. Additionally, in the event that some impurities do bind to the electrocatalyst, the higher temperature increases the removal of the impurities from the electrocatalyst, thereby increasing the voltage recover rate. Once the impurity level returns to an acceptable concentration, reducing the operating temperature from the raised temperature to the normal operating temperature decreases the detrimental effect of the operational life that higher temperatures cause. Therefore, once the impurities sensor no longer detects elevated levels of impurities, or carbon monoxide in this example, it sends a signal to the control unit which in turn signals the gas injector to close the control valve and cease the introduction of heated gas into the fuel supply conduit.

Figure 1:
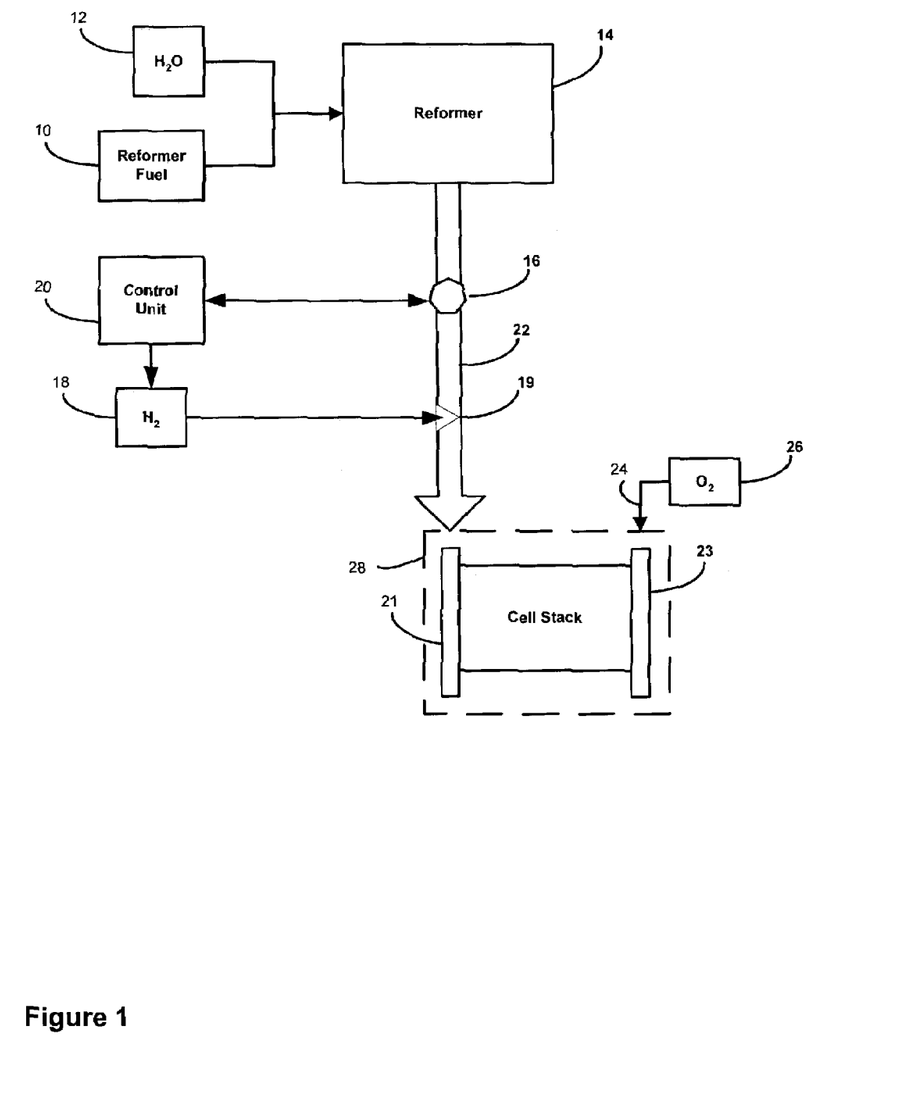
FIG. 1 is a schematic of the fuel cell system according to the present invention.

Referring now to the drawings, the invention will be described in more detail. FIG. 1 shows a schematic of the fuel cell system according to the present invention. A reformer 14 receives methanol, hydrocarbon or other fuel from a fuel supply tank 10, along with water from a water supply tank 12 for producing a hydrogen-rich gas that supplies the fuel cell. A fuel supply conduit 22 feeds a stream of hydrogen-rich gas produced by the reformer to a fuel cell stack 28 at an anode electrocatalyst location, designated generally as 21. The construction of fuel cells is well known by those skilled in the art and the present invention can be applied to any of the currently known fuel cell structures and is not limited to any particular type of fuel cell arrangement. For alloy membranes normal operating temperature can be generally 70° C. while the higher temperature can be generally 90° C. For ceramic membranes, normal operating temperatures can be significantly higher and be in the several hundreds of degrees. An impurity sensor 16 is disposed along fuel supply conduit 22 after reformer 14 but before the gas enters fuel cell stack 28. By detecting the impurity prior to the impurity reaching the fuel cell, the effect of the electrocatalyst poisoning can be minimized prior to experiencing the full effect. It is to be understood that various types of impurity sensors can be utilized to detect a variety of impurities in the fuel stream, such as CO, NH3 and $H_2S$. For illustrative purposes of a preferred embodiment, the impurity sensor detects carbon monoxide. A gas injector 18 for introducing heated gas into the system is connected to fuel supply conduit 22 after impurities sensor 16, but before fuel supply conduit 22 enters fuel cell stack 28 at the anode. A control valve 19 for gas injector 18 is disposed along fuel supply conduit 22. Both impurities sensor 16 and gas injector 18 are in electronic communication with control unit 20. According to sensing a predetermined level of poisoning such as a burst of carbon monoxide, impurities sensor 16 sends a signal to control unit 20. Control unit 20 monitors the changing level of impurities detected by sensor 16 and sends a signal to gas injector 18 to open valve 19, thereby allowing heated gas to be injected into fuel supply conduit 22 and thereby raising the fuel cell temperature to prevent the binding of impurities to the electrocatalyst either by chemical or physical absorption to the electrocatalyst. Additionally, for impurities that do bind to the electrocatalyst, the higher temperature increases voltage recover rates and the rate of impurities are reduced within the fuel cell. Oxygen from air supply 26, is also included in the fuel supply delivered to the fuel cell stack. The oxygen is introduced into fuel cell stack 28 along cathode fuel conduit 24 at a cathode electrocatalyst location, designated generally as 23, for completing the oxidation reaction that completes the fuel cell electrochemical oxidation/reduction reaction. In an alternative embodiment, an additionally impurity sensor 16 can be placed in cathode fuel conduit 24 for detecting impurities in the oxygen supply to raise the operating temperature of the fuel cell stack to prevent the impurities from binding to the cathode.

In an alternative embodiment, a heating coil 30 (FIG. 2) can be used to heat the fuel stream prior to it entering the fuel cell. The heating coil is connected to control unit 20 and heats the fuel stream upon impurities sensor 16 detecting a predetermined level of impurities.

Figure 2:
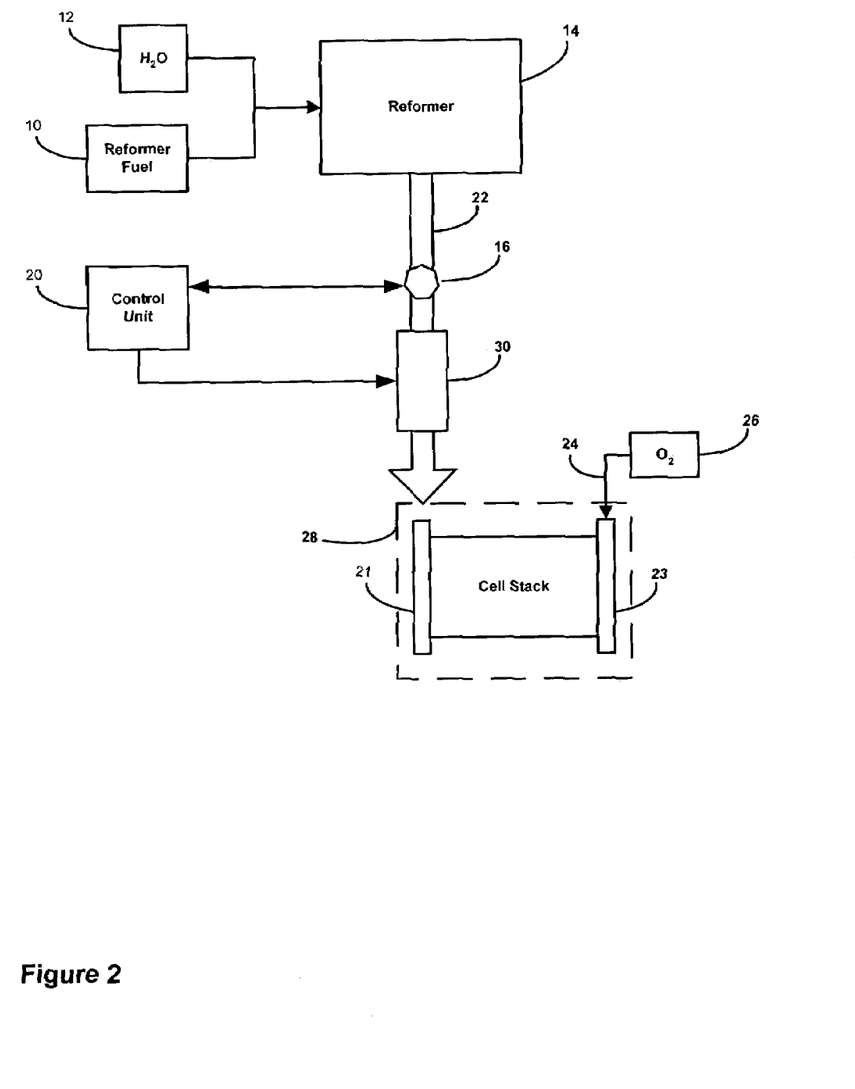
FIG. 2 is a schematic of the fuel cell system according to the present invention.

Impurities sensor detects not only when the predetermined levels of impurities exist, but also when the impurity level is reduced below the predetermined level so as to allow the operating temperature to be reduced. By reducing the operating temperature from the higher temperature to the normal operating temperature, the detrimental effect on the operational life of the fuel cell is reduced. Therefore, once impurity sensor 16 no longer detects elevated levels of carbon monoxide, it sends a signal to control unit 20 which in turn can signal gas injector 18 to close control valve 19 and cease the introduction of heated gas or cease heating the fuel stream being supplied to the fuel cell. This allows the fuel cell to return to the normal operating conditions.

The controlled change of temperature extends the electrocatalyst life by only increasing operating temperature during high levels of impurities. As a result, an electrochemical fuel cell with increased durability and more uniform higher power output is provided.

Table 1 illustrates the advantages of increasing the temperature of a fuel cell in response to increased levels of impurities. The following is provided for a polymer electrolyte membrane fuel cell (PEMFC) using a membrane electrode assembly (MEA) but this invention is certainly not limited to this example. The following table shows dependence of poisoning and recovery rates on $CO/H_2$ mixture composition at 600 mA/cm$^2$ with neat hydrogen as the baseline. Exposure to CO and baseline level was 300 s and 1500 s respectively.

| | $T_{cell}$ = 70° C., P = 202 kPa | | $T_{cell}$ = 90° C., P = 202 kPa | |
|---|---|---|---|---|
| $CO/H_2$ (ppm) | Poisoning rate (V/min) | Recovery rate (V/min) | Poisoning rate (V/min) | Recovery rate (V/min) |
| 3000 | −1.10 | 0.04 | −0.08 | 0.06 |
| 10000 | −1.56 | 0.03 | −0.40 | 0.04 |

At a pressure of 202 kPa, by increasing the operating temperature of the fuel cell from 70° C. to 90° C., in this example, the poisoning rate for carbon monoxide is decreased, though chemical and physical competing absorption and oxidation through electrochemical or chemical means. Additionally, the recovery rate of the fuel cell voltage is shown increased by approximately 50%, thereby requiring less time for the fuel cell to regain its optimal operating efficiency. Thus, when a burst of carbon monoxide is detected by impurities sensor 16, the effect of carbon monoxide poisoning on the electrocatalyst can be mitigated by increasing the operating temperature through the introduction of a burst of hot gas (dry or humid) into fuel supply conduit 22. As such, the carbon monoxide poisoning rate, as noted in Table 1, is decreased due to the increase in the fuel cell temperature. Thus, the fuel cell's performance is only minimally affected by the poisoning when the burst of hot gas is injected into the system before the impurity can enter the fuel cell. Since the higher temperature over time will reduce the operational life of the fuel cell, it is beneficial to return the cell to the normal lower operating temperature as quickly as possible. Therefore, once impurities detector 16 no longer indicates unacceptable levels of impurities, it signals control unit 20 to turn off gas injector 18 to prevent further increase in temperature and allow fuel cell 28 to cool.

By monitoring impurity levels with control unit 20, prior to the fuel entering the fuel cell, it is possible to calculate the time that the carbon monoxide pulse will pass completely through the fuel cell. Thus, after the carbon monoxide pulse has passed, the hot gas injector can be controlled from control 20 allowing the system to decrease the fuel cell temperature to a normal operating temperature to preserve the fuel cell operational life. It is to be understood that this system and method can also be applied to a feedback scheme where impurities are detected once they have entered the fuel cell and to mitigate the effects of poisoning that has already entered the fuel cell.

In an alternative embodiment, a voltage sensor can be used to measure power output of the fuel cell in place of or in combination with the impurities sensor. In this embodiment, the voltage sensor can transmit a signal to the control unit for hot $H_2$ or actuating the heater when the voltage level drops below a predetermined voltage level. Therefore, reacting to the resulting voltage drop by elevating the temperature in the fuel cell can minimize the effect on voltage of any impurities entering the fuel cell. When the voltage stabilized, the control unit can send a signal to the output control vales to stop the injection of hot gas or deactivate the heater allowing the temperature to return to normal so as to reduce the detrimental effect on the fuel cell and improve recovery rates. Additionally, a voltage sensor and impurities sensor can operate in combination to detect impurities and voltage drops so as to actuate the control unit to control temperature producing enhanced performance in the fuel cell. Software in the control unit can detect the need to manipulating the temperature through the impurities sensor or voltage sensor, send a control signal to the gas injector or heater, detect the end of a burst of impurities or voltage drop, and send a control signal to the injector or heater deactivating them.

Figure 3:
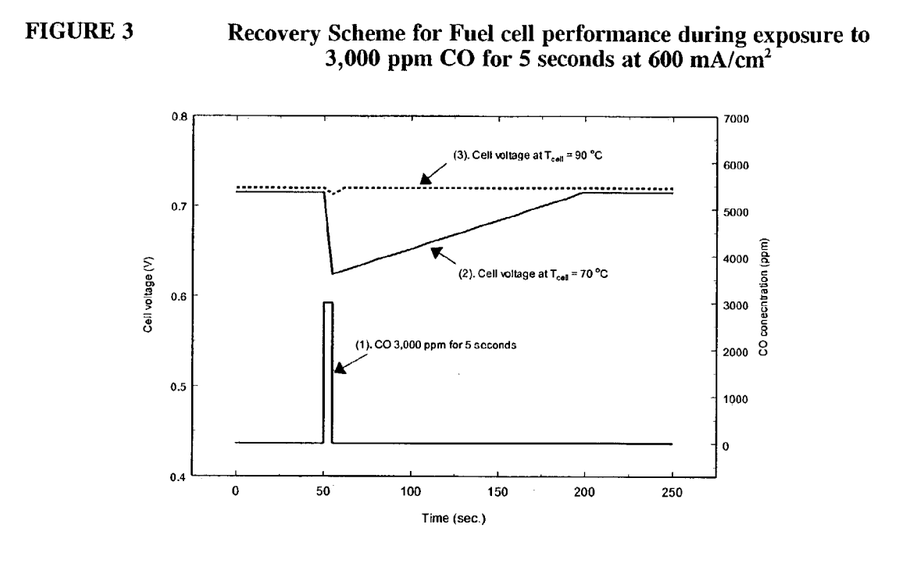
FIG. 3 is a graph showing the fuel cell voltage and affects of concentration of carbon monoxide according to temperature; and, FIG. 4 is a flowchart depicting the change in temperature according to the invention.

Normal operation of the fuel cell at a normal operating temperature is preferred since it may be difficult to maintain optimum humidity of the MEA at the higher temperatures. This is significant since optimum humidity is required for optimum MEA and fuel cell performance. Additionally, some fuel cells operate at lower temperature conditions since external systems would be required to operate to maintain higher temperature operating conditions requiring power. By way of example, FIG. 3 illustrates the results of this invention for a MEA fuel cell during exposure to 3,000 ppm carbon monoxide for 5 seconds at 600 $MA/cm^2$. Line 1 shows the transient in carbon monoxide concentrations that is detected by impurities sensor 16 (FIG. 1). Line 2 shows the fuel cell performance with a burst of carbon monoxide impurity, but without this invention. In this instance the recover time for the cell voltage is substantially longer than with the use of this invention. Line 3 shows the performance of the fuel cell when this invention increases in fuel cell temperature upon detection of an impurity, carbon monoxide burst, and then a return to normal temperature after the impurity is flushed from the fuel cell. Without the use of this invention, a fuel cell operating at 600 $MA/cm^2$ shows a rapid decrease in cell voltage at 70° C. when exposed to a large transient carbon monoxide impurities concentration as shown in Line 2.

As shown in Line 3, the increase in temperature will significantly decrease the voltage drop to provide more uniform power output. In an alternative embodiment, a heater is used for raising the temperature of the injected gas and disengaged so the injected fuel is no longer to be heated so as to allow the fuel cell to return to normal operating temperatures.

Figure 4:
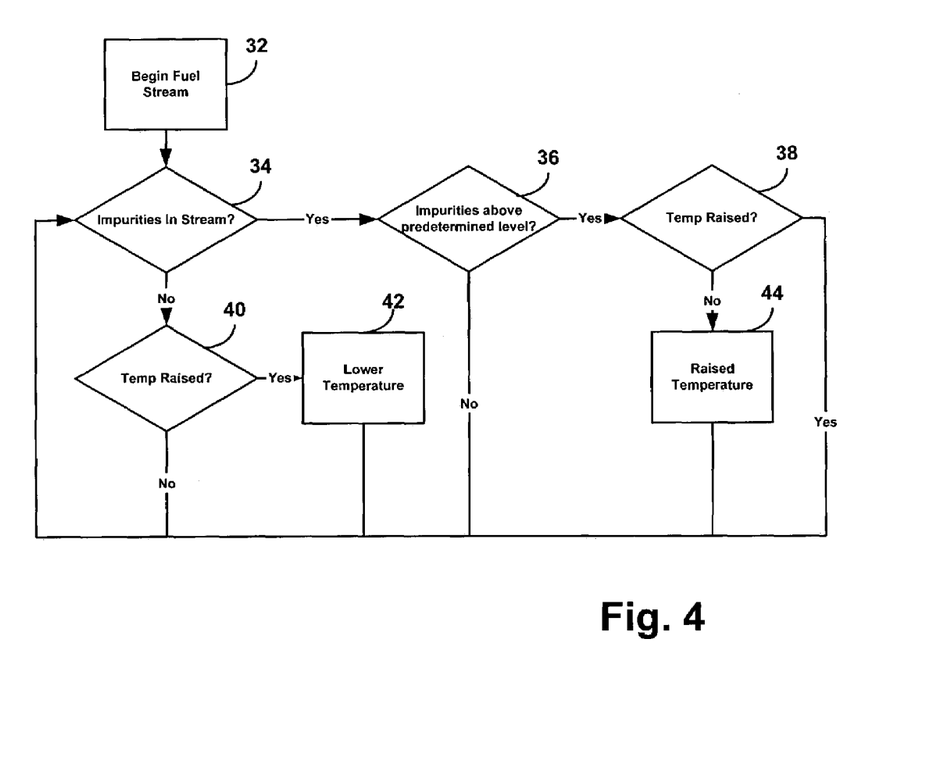

Referring now to FIG. 4, the method of operation of this invention is described in further detail. Additionally, the procedural descriptions are representations used by those skilled in the art to most effectively convey the substance of this work to others skilled in the art. These procedures are generally a self-contained sequence of steps leading to a desired result. In the event of the control unit, these steps require physical manipulations of physical quantities such as electrical and magnetic signals capable of being stored, transferred, combined, compared, or otherwise manipulated. Therefore, this invention is described with reference to flowchart illustrations of methods, apparatus, and computer program products according to the invention in order to convey the understanding that each block of the flowchart illustration can be implemented by a set of computer readable instructions embodied in a computer readable medium. These computer readable instructions may be loaded onto a general purpose computer, special purpose computer, or other programmable data processing apparatus to produce the machine for which the instructions will execute. It will be understood that each block of a flowchart illustration can be implemented by special purpose hardware based computer systems that perform this specific function, or steps, in combination with special purpose hardware or computer instructions.

Referring now to FIG. 4, the fuel stream begins at step 32. A determination is made whether impurities exist in the fuel stream in step 34. If impurities do not exist, a determination is made on whether the temperature has previously been raised in step 40. If it has not, then the process returns to step 34. If in step 40, the temperature has previously been raised, then the temperature is lowered in step 42 and the process returns to step 34. In step 34, if impurities do exist in the stream, a determination can be made as to whether the impurities are above a predetermined level in step 36. If they are not, then the process returns to step 34. In the event that the impurities are above a predetermined level, the determination is made as to whether the temperature has previously been raised in step 38. If it has, then the process returns to step 34. In the event that the temperature has not been raised in step 38, then the temperature is raised in step 44, and the process returns to step 34.

While a preferred embodiment of the invention has been described using specific terms, such description is for illustrative purposes only, and it is to be understood that changes and variations may be made without departing from the spirit or scope of the following claims.

What is claimed is:

1. An electrochemical fuel cell system adapted for maintaining the efficient production of electrical power of a fuel cell, said system comprising:

a fuel cell having a normal operating temperature for producing electricity;

a fuel supply containing a hydrogen rich fuel for delivery to said fuel cell;

a fuel supply conduit connecting said fuel supply and said fuel cell for delivering a fuel stream of said hydrogen rich fuel to said fuel cell;

a heating mechanism in communication with said fuel supply conduit operative to generate heat in said fuel supply conduit for increasing the temperature of said fuel stream entering said fuel cell to raise said normal operating temperature of said fuel cell to an elevated operating temperature; and, an impurity sensor carried by said fuel supply conduit for sensing impurities in said fuel stream prior to said impurities entering said fuel cell;

said impurity sensor operatively associated with said heating mechanism for activating said heating mechanism in response to detecting impurities in said fuel stream prior to said impurities entering said fuel cell;

whereby, said normal operating temperature of said fuel cell is raised to said elevated operating temperature before said impurities enter said fuel cell so that binding of said impurities within said fuel cell is resisted.

2. The system of claim 1 including a control unit in communication with said impurity sensor and said heating mechanism for monitoring impurity levels detected by said impurity sensor and controlling activation of said heating mechanism based on the level of said impurities in said fuel stream.

3. The system of claim 1 including a hot gas injector included in said heating mechanism connected to said fuel supply conduit for introducing a stream of heated gas into said fuel supply conduit to rapidly raise the temperature of said fuel cell so that said impurities are prevented from binding to electrocatalysts contained within said fuel cell.

4. The system of claim 3 wherein said stream of heated gas comprises heated hydrogen gas.

5. The system of claim 1 includes a heating coil included in said heating mechanism disposed around said fuel supply conduit for heating said fuel stream within said fuel supply conduit prior to entering said fuel cell to rapidly raise the temperature of said fuel cell so that said impurities are prevented from binding to electrocatalysts contained within said fuel cell.

6. The system of claim 1 including a voltage sensor in communication with said fuel cell for detecting changes in the voltage of said fuel cell from a predetermined voltage level, wherein said voltage sensor is operatively associated with said heating mechanism to activate said heating mechanism when a drop in voltage is detected below a predetermined level, and to deactivate said heating mechanism when a return in voltage is detected.

7. A method of improving the efficiency of an electrochemical fuel cell system of the type having a fuel supply for delivering a hydrogen rich fuel stream through a fuel supply conduit to a fuel cell stack, said method comprising the steps of:

providing an impurity sensor carried by said fuel supply conduit communicating with said fuel stream passing therein for detecting impurities in said fuel stream;

detecting the presence of impurities in said fuel stream passing through said fuel supply conduit;

monitoring said impurities in said fuel stream to determine an impurity level prior to said impurities entering said fuel cell;

detecting a rise in said impurity level above a predetermined impurity level prior to said impurities entering said fuel cell;

providing a heating mechanism disposed between said impurity sensor and said fuel cell communicating with said fuel supply conduit and said impurity sensor, wherein said heating mechanism is operative to generate heat in said fuel supply conduit for increasing the temperature of said fuel stream entering said fuel cell so that a normal operating temperature of said fuel cell is raised to an elevated operating temperature by heating of said fuel stream; and, activating said heating mechanism in response to detecting said rise in said impurity level to raise the temperature of said fuel cell stack to said elevated operating temperature before said impurities enter said fuel cell;

whereby, raising said normal operating temperature of said fuel cell to said elevated operating temperature before said impurities enter said fuel cell resists binding of said impurities within said fuel cell to maintain efficient electricity production.

8. The method of claim 7 including the step of detecting a drop in said impurity level below said predetermined impurity level in said fuel stream passing through said fuel supply conduit.

9. The method of claim 8 including the step of deactivating said heating mechanism to lower the temperature of said fuel cell stack to a said normal operating temperature in response to detecting said drop in said impurity level below said predetermined impurity level.

10. The method of claim 7 including the step of heating said fuel cell stack by activating a hot gas injector for rapidly infusing heated gas into said fuel supply conduit.

11. The method of claim 7 including the step of heating said fuel cell stack by activating a heating coil disposed around said fuel supply conduit for heating said fuel stream prior to entering said fuel cell stack.

12. The method of claim 7 including the step of deactivating said heating mechanism after a predetermined period of time expires and said impurities drop below said predetermine impurity level.

13. The method of claim 7 including the step of detecting a drop in voltage of said fuel cell stack from a predetermined voltage level.

14. The method of claim 13 including the step of activating said heating mechanism to raise the temperature of said fuel cell stack to said elevated operating temperature upon detecting a drop in voltage below said predetermined voltage level.

15. The method of claim 14 including the step of deactivating said heating mechanism to lower the temperature of said fuel cell stack to said normal operating temperature when said voltage sensor detects a return in voltage to said predetermined voltage level.

* * * * *